(12) United States Patent
Bors

(10) Patent No.: US 6,411,656 B1
(45) Date of Patent: Jun. 25, 2002

(54) ECHO CANCELLING SOFTMODEM

(75) Inventor: Emanoil Felician Bors, Paris (FR)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/303,046

(22) Filed: Apr. 30, 1999

(51) Int. Cl.$^7$ .......................... H04L 25/34; H04L 25/49
(52) U.S. Cl. .......................... 375/285; 370/286; 379/3; 379/406; 455/296; 455/570
(58) Field of Search ................................. 375/285, 254, 375/278, 346; 370/286, 287, 288, 289; 379/3, 406, 410; 455/296, 570

(56) References Cited

U.S. PATENT DOCUMENTS

| | | | |
|---|---|---|---|
| RE31,253 E | * 5/1983 | Weinstein | 179/170.2 |
| 5,680,393 A | * 10/1997 | Bourmeyster et al. | 370/286 |
| 5,872,836 A | 2/1999 | Suffern et al. | 379/93.26 |
| 6,181,753 B1 | * 1/2001 | Takada et al. | 375/346 |

* cited by examiner

*Primary Examiner*—Mohammad H. Ghayour
(74) *Attorney, Agent, or Firm*—McDonnell Boehnen Hulbert & Berghoff

(57) ABSTRACT

A method and apparatus for aligning a received echo signal. The method operates by determining a memory address pointer value that directs which transmit data is to be transmitted. The pointer is selected such that an appropriate delay is created, resulting in the associated received echo having a certain timing alignment within the received block of data. The method thus includes predetermining a pointer or pointer offset value; generating blocks of digital transmit data; transferring the transmit digital data to a converter using the determined pointer or pointer offset value; converting the transmit digital data to a transmit analog signal and transmitting the analog signal; sampling a received signal and forming blocks of received digital data, wherein the received signal includes a transmit echo; and wherein the pointer offset results in block alignment between the transmit echo from a transmit block and a receive block. The pointer offset determination is performed by determining a correlation between the transmit data and the transmit echo within the receive data. The method is well suited for use in a microprocessor-based modem operating on blocks of data. The echo cancelling modem apparatus thus includes memory for storing transmit and receive data values arranged in data blocks; an interface circuit interconnected to the memory, where the interface circuit has a transmit data buffer, a receive data buffer, an address generator, a transmit address buffer, and a receive address buffer.

15 Claims, 4 Drawing Sheets

ECHO CANCELLING SOFTMODEM

FIELD OF THE INVENTION

The invention relates to electronic communications systems and more particularly to a method and device for aligning a received echo signal within a received block of data such that the echo is aligned to a predetermined transmit block of a data.

BACKGROUND OF THE INVENTION

Computers typically use modems to communicate digital information over voice-grade telephone lines. Such modems translate digitally expressed information from the computer into analog frequency signals suitable for transmission over the voice-grade telephone facility, and convert such signals back into digital form when received from the telephone line.

High speed modems may advantageously employ digital signal processing techniques for translating outgoing digital data into a sequence of digital values each representing a desired analog output signal sample amplitude. These digital sample values may then be converted into analog form by a digital-to-analog converter for transmission over the telephone facility. Correspondingly, at the receiving station, the incoming analog signal may be converted into a train of digital sample amplitude values which are then processed to reconstruct the original digital data.

In some prior art systems, the processing of the digital sample values is accomplished by one or more dedicated microprocessors within the digital modem. For example, U.S. Pat. No. 5,008,091 issued on Apr. 16, 1991 and herein incorporated by reference, describes a modem that employs three such dedicated microprocessors. These microprocessors are (1) a transmitting microprocessor dedicated primarily to the translation of digital data into digital sample values; (2) a receiving microprocessor devoted primarily to the translation of sample amplitude values back into digital data; and (3) a supervisory microprocessor which serves as the interface to the computer to which the modem is connected.

Still other systems known in the art employ analog/digital conversion methods to convert received analog signals into digitally expressed analog sample values and, during transmission, to convert digitally expressed sample values into analog form. These systems, however, process the digital sample value signals by the microprocessor already present in the connected computer, instead of by processors within the modem unit. As a consequence, the cost of the modem is substantially reduced because the need for separate processors is eliminated. Such a modem is shown in U.S. Pat. No. 5,872,836, issued Feb. 16, 1999, the contents of which are hereby incorporated herein by reference.

Typically, a conventional host computer employing a microprocessor is combined with a low-cost interface unit consisting of telephone line adapter circuitry, an analog/digital converter, and a direct digital interface to the host computer's system I/O bus. The telephone interface unit exchanges digitally-expressed analog sample amplitude values directly with the connected host computer, and the microprocessor within the host computer handles the remainder of the digital processing. The telephone interface unit serves as the analog front-end componentry to the digital processing on the host computer. Such as a system is typically operated as a modem, with digital data being processed into a sequence of digitally expressed sample values in accordance with a selected one of several accepted modem formats and transmission speeds.

The transceiver, as is typical, must contend with echoes of the transmitted signal that interfere with the desired receive signal. The echo component of the transmitted signal received at the receiver results from hybrid or other impedance mismatches, and the like. Because this echo presents an undesirable form of distortion to the received signal, it is desirable to eliminate the echo component to the extent possible. Echo cancellation techniques are well developed and well known in the telecommunication arts. One such echo cancellation technique accomplishes this by canceling the echo with a local replica of the echo signal that is arrived at via a filtering technique.

SUMMARY OF THE INVENTION

A method and apparatus for aligning a received echo signal is provided. In two-wire full-duplex transceiver devices, such as common two-wire voice-frequency modem devices, a local echo component is undesirable due to its interference with the intended received signal that has been transmitted from the distant end. The local echo is generated by the transceiver's receiver section due to its inability to distinguish between signals from the distant end and signals that have in actuality been transmitted by its own transmit portion.

The method is well suited to modems operating on a host processor of a general purpose computer, referred to herein as a softmodem because of the minimal hardware elements associated exclusively with the modem apparatus and function. The method operates by predetermining a memory address pointer value that determines which transmit data is to be selected from memory for transmission over the two-wire line. The pointer is selected such that an appropriate delay is created, resulting in the associated received echo having a desired timing alignment within the received block of data.

The method thus includes predetermining a pointer offset value; generating blocks of digital transmit data; transferring the transmit digital data to a converter using the predetermined pointer offset value (and a base memory address); converting the transmit digital data to a transmit analog signal and transmitting the analog signal; sampling a received signal and forming blocks of received digital data, where the received signal includes a transmit echo. The use of the pointer offset value results in block alignment between a receive block and the transmit echo component originating from a given transmit block.

The pointer offset predetermination is performed by determining a correlation between the transmit data and the transmit echo within the receive data. The pointer is then initialized by setting an address generator within an ASIC interface device that samples incoming analog signals and converts outgoing transmit data to an analog signal.

The method may also be implemented by adjusting the receive block framing to coincide with the embedded transmit echo from a given transmit data block. The method includes determining a pointer and offset pointer value that is used to transfer the data received in a serial fashion into desired memory block regions that are then read by the microprocessor.

The method is well suited for use in a microprocessor-based modem operating on blocks of data. The microprocessor is preferably associated with a general purpose computer, while the analog front end and the data conversion elements reside on a telephone expansion interface card. The echo cancelling modem apparatus thus includes memory for storing transmit and receive data values arranged in data blocks; an interface circuit interconnected to the memory, where the interface circuit has a transmit data buffer, a receive data buffer, an address generator having a transmit address register, a receive address register, and an offset register. The transmit and receive address registers contain transmit and receive pointers, respectively, to locations within the memory that are used by the ASIC interface to effect the exchange of data with the processor. The offset register is used to insert a delay by modifying either the transmit or receive addresses, thus affecting the transfer of data between the processor and the interface.

Also included is a A/D-D/A converter connected to the interface circuit for converting between analog and digital signals. The interface circuit also includes an interrupt generator that interupts the microprocessor to indicate that a block of receive data has been written to the memory.

The methods may also be incorporated in software instructions and placed on a computer-readable medium. This medium thus contains instructions for causing a general-purpose computer to perform the following steps: generate blocks of transmit data and store the transmit blocks in a first memory location; read blocks of receive data from a second memory location; process the blocks of receive data to remove echoes of the transmit data using corresponding blocks of transmit data in a one-to-one relationship; initialize pointer registers, wherein the pointer register values determine memory locations from which transmit data blocks are selected for transmission, thereby inserting a transmission delay that results in block alignment of the transmit echo within a receive block.

The foregoing and other features and advantages of an illustrative embodiment of the present invention will be more readily apparent from the following detailed description, which proceeds with references to the accompanying drawings.

DETAILED DESCRIPTION OF A PREFERRED EMBODIMENT

Figure 1:
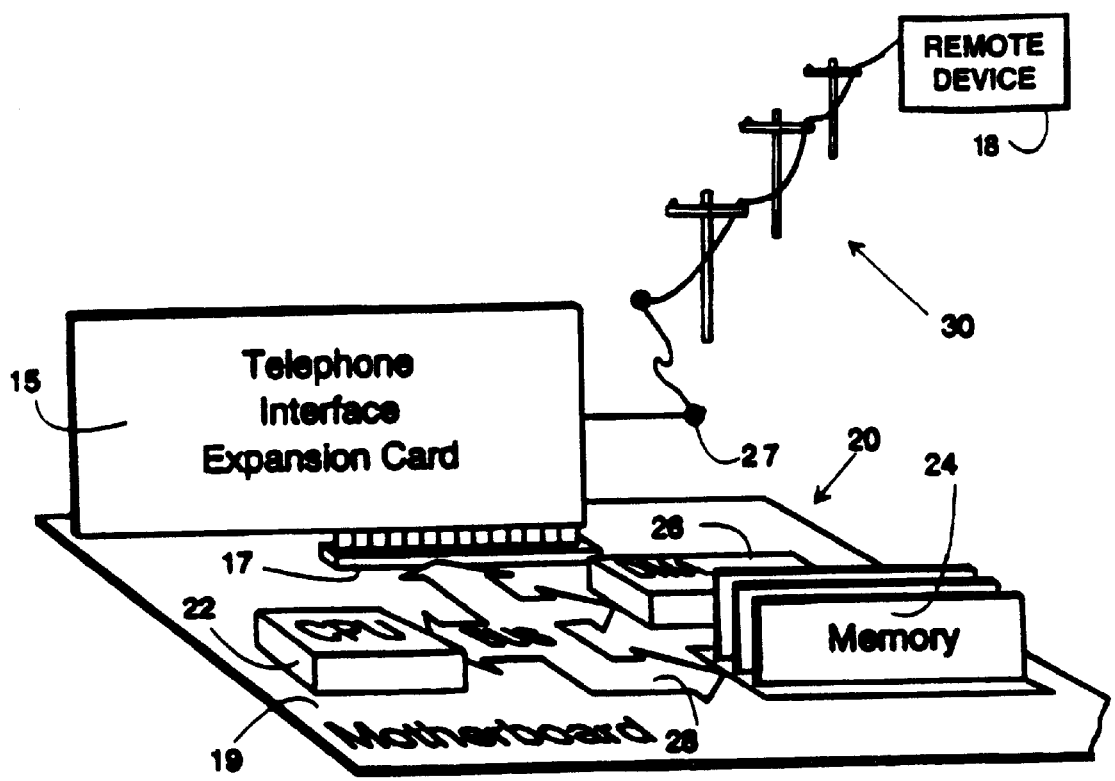
FIG. 1 shows the preferred embodiment of the softmodem.

A preferred embodiment of the present invention in which the digital signals are processed by the microprocessor on the host computer is illustrated in FIG. 1. The digital signal corresponds to the samples of an analog signal. Shown are auxiliary components mounted on a telephone interface expansion card 15 that plugs into an available socket 17 on the motherboard 19 of a conventional personal computer indicated generally at 20. The host computer 20 includes a conventional integrated microprocessor 22 which executes programs stored in a random access memory (RAM) memory unit which is depicted in FIG. 1 as a group of SIMM (single inline memory module) devices 24 mounted on the motherboard 19. The RAM memory 24 is typically loaded with programs to be executed by the microprocessor 22 from their permanent storage location on a magnetic disk drive, CD-ROM drive, or other storage medium (not shown). The microprocessor is selected, for example, from the Intel Pentium™ family of processors that have MMX capabilities, or their functional equivalents. The host computer 20 includes a standard DMA (direct memory access) controller 26, an internal system bus 28 which interconnects the microprocessor 22, the RAM 24, the DMA controller 26 and the expansion card 15 via the expansion socket 17.

Figure 2:
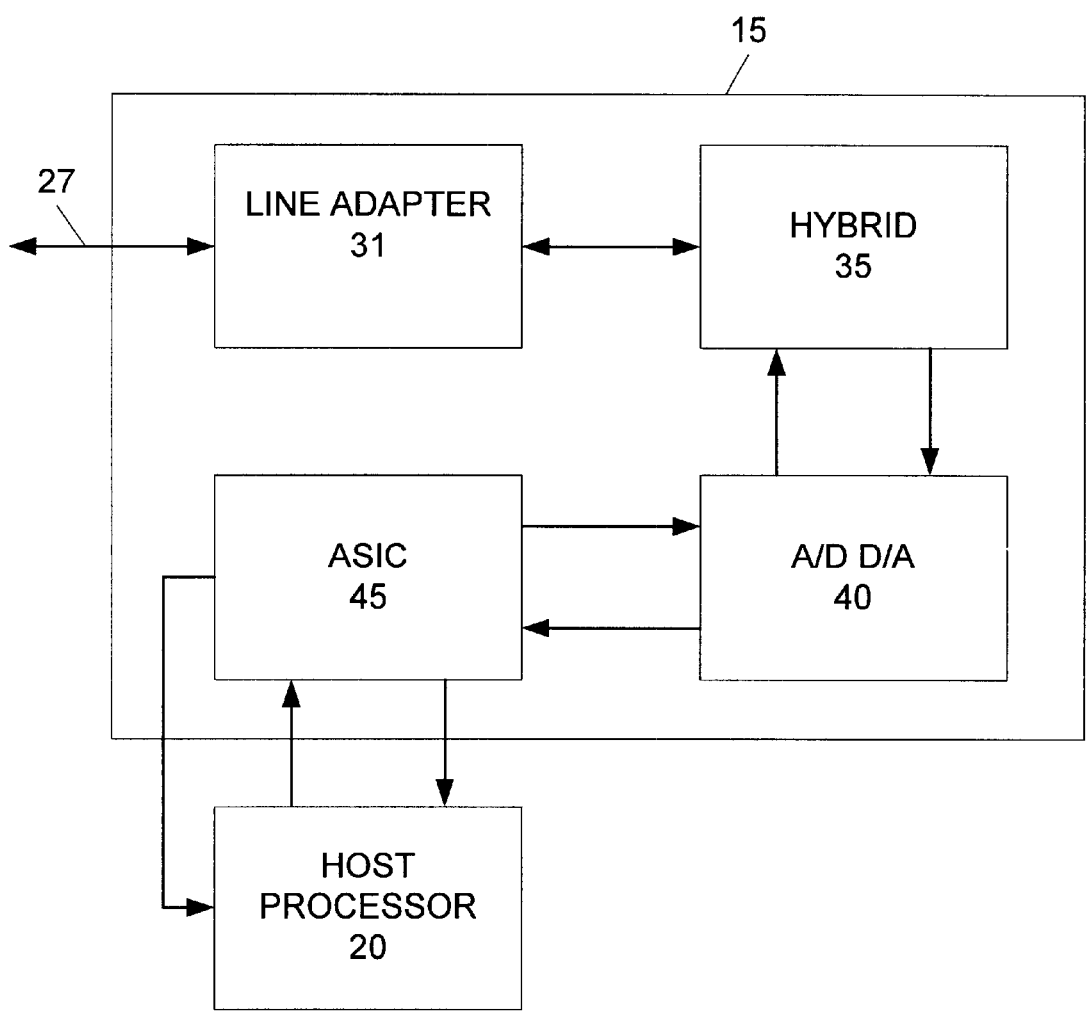
FIG. 2 shows a preferred embodiment of the Telephone interface expansion card.

As seen in both FIGS. 1 and 2, the expansion card 15 is provided with a standard telephone jack 27 through which a connection is made to a conventional voice-grade telephone line 30. The major components included on the interface card 15 are seen in FIG. 2. The card 15 takes the form of a standard "half-size adapter card" which plugs into an available expansion slot 17 on the host computer 20 to connect to the host computer's internal bus 28. The card 15 is preferably a PCI type card, but may also be an AT type bus, PCMCIA slot, or other similar standard bus architecture well known in the art.

The interface card 15 of the system shown in FIGS. 1 and 2 sends and receives analog signals over a voice-grade analog telephone line which is connected at the terminal 27. Two standard RJ11 telephone jacks (not shown) may be used to provide convenient external connections to standard telephone equipment, one jack accepting a plug from the telephone line and the second a plug from a telephone station set which may share use of the line.

As seen in FIG. 2, the telephone interface card 15 includes a line adapter circuit 31 that interconnects the telephone terminal 27 with a hybrid circuit 35 which splits the analog voice-band signal into inbound and outbound components which are respectively sent to and received from the analog ports of an analog/digital converter (ADC) 40. Converter 40 samples received voice-band signals, encodes the sample amplitudes into digitally-expressed values, and sends these values via interface circuitry seen at 45 in FIG. 2 to the host computer 20. The conventional processor within the host computer 20 processes incoming digitally-expressed sample values to perform one of a variety of functions, depending on the nature of the incoming signal.

Outbound communications originate within the host computer 20 that processes the information to be sent to create a sequence of digitally-expressed sample amplitude values which are sent via the interface circuitry 45 to the converter 40 which transforms the digital sample values into the corresponding voice band analog signal which is applied via the hybrid circuit 35 and the line adapter 31 to the telephone line connected to terminal 29.

The interface circuitry 45 shown in FIGS. 1 and 2 is preferably an application-specific integrated circuit (ASIC) having standard PCI bus interface circuitry to interface either directly or indirectly with the RAM 24 via the PCI bus 28 to facilitate the transfer of blocks of data from RAM memory to the analog/digital converter 40. The random-access memory (RAM) stores large multiple blocks of data in address buffers 120 and 122, where the blocks are organized as "pages."

Figure 3:
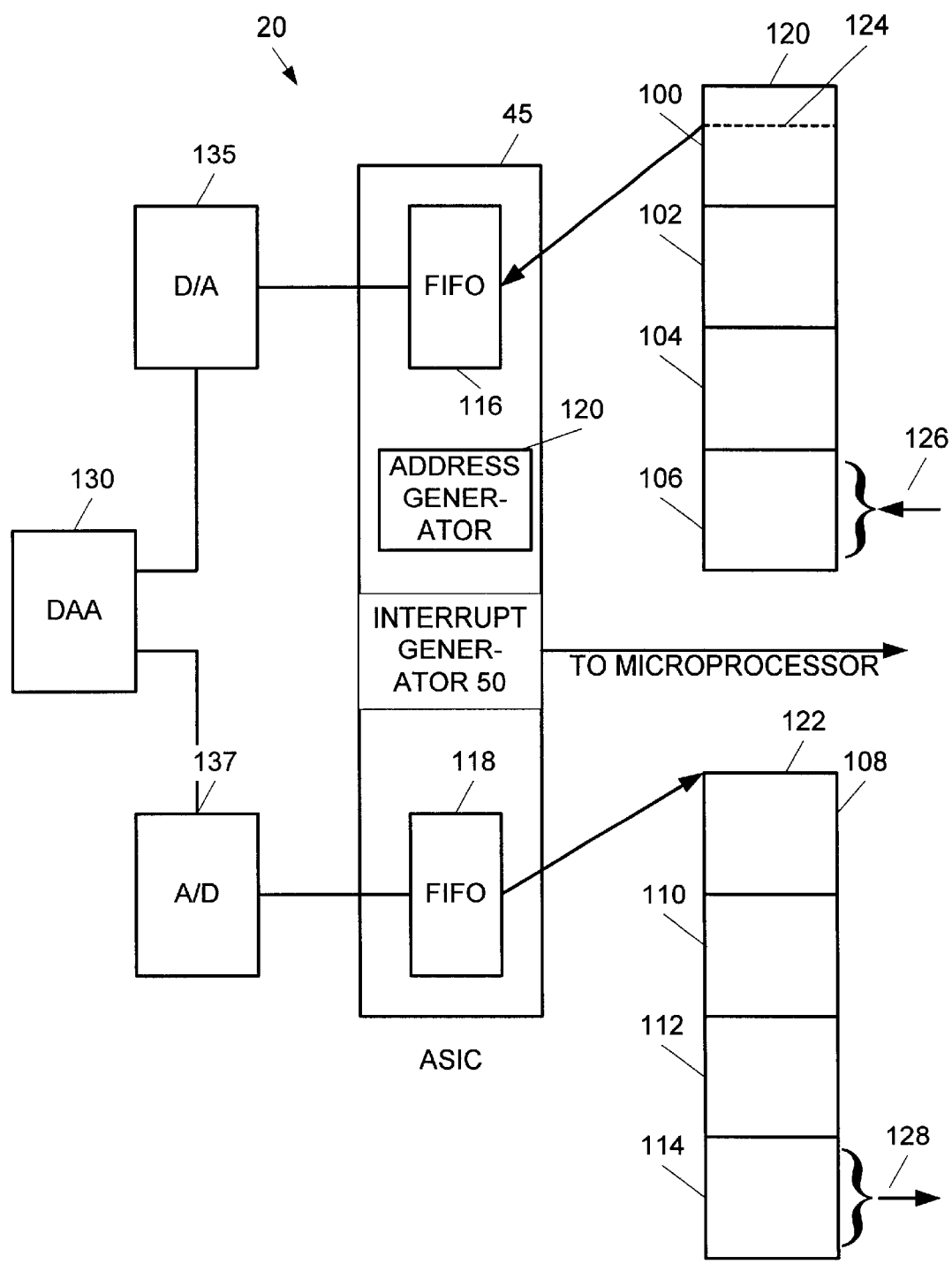
FIG. 3 shows a functional block diagram of the softmodem.

With reference to FIG. 3, the pages 100, 102, 104, and 106 hold transmit data generated by the host processor, while pages 108, 110, 112, and 114 hold receive data to be processed by the host processor. The ASIC interface 45 also includes two FIFO buffers (First In First Out) 116, 118 and an address generator 120. The address generator includes transmit and receive pointer registers and an offset pointer register. The pointer registers provide the ASIC 45 with the memory locations of memory buffers 120 and 122, as well as the pointer offset value that is shown at 124. The microprocessor 22 obtains the data from the buffers 120, 122 a block at a time, as shown by arrows 126, 128. The processor 22 is notified by interrupt generator 50 that a complete block of data has been transferrred to memory 24. The memory blocks within buffers 120, 122 are preferably circular buffers, as opposed to linear shift registers, with the address generator 120 utilizing the base addresses initially sent by the microprocessor 22 to generate and increment the memory location addresses in a circular fashion. Thus, microprocessor 22 loads page 106 while ASIC 45 reads page 100 (or more particularly an offset thereof, based on the offset pointer value). After the data has been read from block 100, the page 100 is made available to the microprocessor 22 for the next block of transmit data, while the ASIC 45 reads from page 102. This circular buffering process also applies to the receive data memory buffer 122.

The ASIC 45 is connected to a DAA 130 (Data Access Arrangement) by way of data converters 135, 137. DAAs are well known in the art, and suitable devices for use in the circuit of FIG. 3 are available from Mitel, Silicon Labs, and Analog Devices. The DAA 130 provides ring voltage detection, overvoltage protection, transmit and receive gain amplifiers, etc., and other functionality associated with subscriber line interfaces.

The processor 22 performs the echo cancellation using well known digital signal processing operations such as digital filtering. As is well-known in the art, digital filtering is performed by multiplying a sequence of filter taps by the discrete-time sequence of data samples, and summing the output as shown by the formula $$y(n) = \sum_{k=0}^{\infty} h(k)x(n-k)$$

where x(n) is an input sequence, y(n) is the filter output sequence, and h(n) is the filter impulse response. Of course, if the filter has a finite impulse response (FIR) of length N, then the summation is performed on for k=0 to N−1.

The echo canceller works by generating a local replica of the echo signal from the transmit data signal using a digital filter that models the echo channel impulse response. There is, however, a delay time associated with the echo path. The delay time means that the echo component contained within the received signal blocks is not associated with, or generated by, the contemporaneously transmitted data block. The echo will correspond to data transmitted at an earlier time, and there will generally not be block alignment. That is, the echo from a given transmit block will overlap into portions of two receive data blocks. This means that processing the transmit data to generate a local replica of the echo will require FIR filtering of more than one page of transmit data. That is to say, because the echo associated with a given block of transmit data is generally not block-aligned with blocks of receive data, the processor must filter portions of two separate blocks of transmit data to generate the samples of the echo replica needed for a given receive block.

Because the processor 22 operates on data structures corresponding to the blocks of transmit and receive data, it is desirable to have block alignment. If block alignment is achieved, the processor 22 can cancel the echo contained within a receive block by filtering a single transmit block. This results in more efficient software programming, and portability of the software among different hardware platforms.

The processor 22 initializes the address generator 120 with the appropriate amount of delay. The delay is preferably predetermined for the given DAA 130 and associated circuitry through which the echo passes, including the D/A 135 and A/D 137 converters. This delay may be determined by performed correlations to determine the number of sampling instants that it takes to receive the echo. Preferably, the delay determination is performed when the device is manufactured. Because the local echo path is mainly a function of the hardware on the telephone interface expansion card 15, the delay, and hence the offset pointer value, may be determined once for the hardware configuration design. This value is then stored in memory 24 and is embedded in the modem software. Upon modem initialization by the processor 22, the processor programs the ASIC address generator 120 with the address pointers and the pointer offset value.

Figure 4:
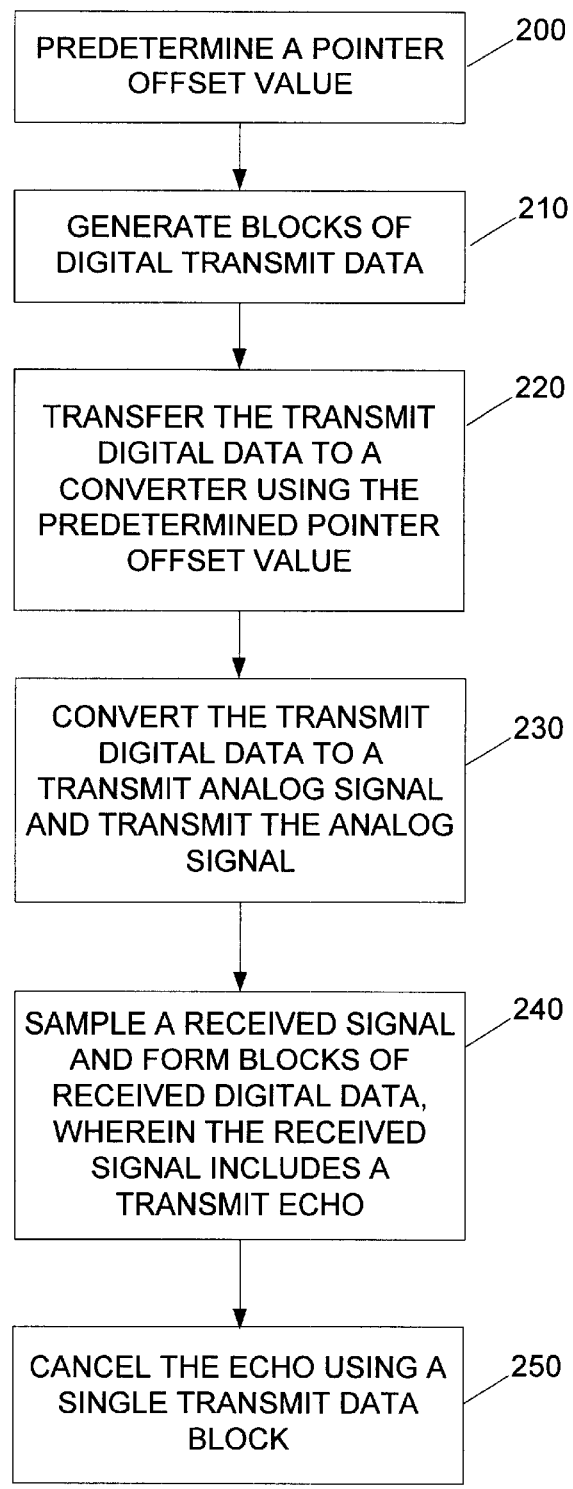
FIG. 4 shows a flow diagram of the operation of the echo alignment method.

The flowchart of FIG. 4 depicts the method of achieving block alignment. At step 200 the pointer offset value is determined. This is preferably predetermined during the design of the device and is embedded within the software. It may be performed, however, on the fly during device operation by using a correlation procedure as is well known in the telecommunication arts. At step 210 the transmit data blocks are generated. The data is transferred at step 220 using the offset pointer. This is performed by the ASIC 45 accessing the host computer's memory 24 over the data bus 28. The data is sent by the ASIC 45 to the D/A converter 135 and the signal is transmitted over the two-wire communication circuit in step 230. The receiver portion, including the D/A converter 137 of the softmodem samples the incoming signal at step 240. The received signal contains an echo component corresponding to previously transmitted data. Because of the use of the offset pointer value, the echo component within a given block of receive data corresponds to the transmit data within a single transmit block, and block alignment has been achieved. The echo may then be cancelled using only a single transmit block as shown in step 250.

The present embodiment preferably includes logic to implement the described methods in software modules as a set of computer executable software instructions. The Computer Processing Unit ("CPU") or microprocessor implements the logic that controls the operation of the transceiver. The microprocessor executes software that can be programmed by those of skill in the art to provide the described functionality. The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method of aligning a received echo signal comprising the steps of:

predetermining a pointer offset value;

generating blocks of digital transmit data;

transferring the transmit digital data to a converter using the predetermined pointer offset value;

converting the transmit digital data to a transmit analog signal and transmitting the analog signal;

sampling a received signal and forming blocks of received digital data, wherein the received signal includes a transmit echo; and wherein the pointer offset determination results in block alignment between the transmit echo from a transmit block and a receive block.

2. The method of claim 1 wherein the step of predetermining the pointer offset includes the step of determining a correlation between the transmit data and the transmit echo within the receive data.

3. The method of claim 1 wherein the transferring step includes accessing a memory location using a base address and the predetermined pointer offset value.

4. The method of claim 1 wherein the transferring step includes initializing an address generator using the pointer offset value.

5. The method of claim 1 further comprising the step of cancelling the echo signal by filtering a single transmit data block.

6. A method of aligning a received echo signal comprising the steps of:

predetermining a pointer offset value;

generating blocks of digital transmit data;

converting the transmit digital data to a transmit analog signal and transmitting the analog signal;

sampling a received signal and forming blocks of received digital data, wherein the received signal includes a transmit echo;

transferring the receive digital data to memory using the predetermined pointer offset value; and, wherein the pointer offset results in block alignment between the transmit echo from a transmit block and a receive block.

7. The method of claim 6 wherein the step of predetermining the pointer offset includes the step of determining a correlation between the transmit data and the transmit echo within the receive data.

8. The method of claim 6 wherein the transferring step includes accessing a memory location using a base address and the predetermined pointer offset value.

9. The method of claim 6 wherein the transferring step includes initializing an address generator using the pointer offset value.

10. The method of claim 6 further comprising the step of cancelling the echo signal by filtering a single transmit data block.

11. An echo alignment apparatus for aligning a received echo within a block of received data, for use in a microprocessor-based modem operating on blocks of data, comprising:

memory for storing transmit and receive data values arranged in data blocks;

an interface circuit having a transmit data buffer, a receive data buffer, an address generator with a an offset register, a transmit address register, and receive address register, said offset, transmit, and receive address registers containing offset, transmit, and receive pointers, respectively;

a converter connected to said interface circuit for converting between analog and digital signals;

said interface circuit being connected to said memory and accessing said memory using said transmit and receive pointers in conjunction with said offset pointer.

12. The apparatus of claim 11 wherein said interface circuit accesses said memory to obtain transmit data at a memory location determined by said transmit pointer and said offset pointer.

13. The apparatus of claim 11 wherein said interface circuit accesses said memory to load receive data into a memory location determined by said receive pointer and said offset pointer.

14. The apparatus of claim 11 wherein said interface circuit generates a block signal to indicate that a block of receive data has been written to said memory.

15. The apparatus of claim 11 further comprising an interrupt generator to interupt the microprocessor once a complete data block has been transferred to memory.

* * * * *